United States Patent [19]
Cather, Jr. et al.

[11] 4,289,318
[45] Sep. 15, 1981

[54] HYDRAULIC MOTOR BALANCING RING SEAL

[75] Inventors: Douglas A. Cather, Jr.; Martin E. Benjamin, both of Gastonia, N.C.

[73] Assignee: Garlock Inc., Longview, Tex.

[21] Appl. No.: 133,539

[22] Filed: Mar. 24, 1980

[51] Int. Cl.³ .................. F16J 15/32; F16J 15/34
[52] U.S. Cl. ............................... 277/12; 277/83; 277/92; 277/95; 277/177; 277/211; 418/61 B
[58] Field of Search ............. 277/12, 83, 92, 95, 277/152, 84, 165, 173, 177, 207 R, 211; 418/61 B

[56] References Cited

U.S. PATENT DOCUMENTS

| | | | |
|---|---|---|---|
| 3,075,781 | 1/1963 | Atkinson et al. | 277/95 X |
| 3,137,508 | 6/1964 | Cunningham | 277/211 X |
| 3,171,662 | 3/1965 | Warn et al. | 277/211 |
| 3,199,878 | 8/1965 | Cunningham et al. | 277/95 X |
| 3,269,738 | 8/1966 | Baumler et al. | 277/92 X |
| 3,572,983 | 3/1971 | McDermott | 418/61 B |

*Primary Examiner*—Robert S. Ward, Jr.
*Attorney, Agent, or Firm*—Schovee & Boston

[57] ABSTRACT

Inner and outer sealing rings (16 and 18) for the balancing ring (12) of a hydraulic motor, each comprising an annular elastomeric body (30) including a flat, radially extending central ring (36) and a pair of sealing elements (38 and 40) projecting axially away from opposite ends of the central ring (36) and in opposite axial directions therefrom and tapering to a sealing lip (50 and 52) in the directions away from the central ring. The inner and outer sealing rings (16 and 18) have cylindrical O.D. and I.D. surfaces, (54 and 66), respectively. Each sealing ring preferably has a reinforcing ring (32 and 62) and a liner (34 and 64) of low friction material.

48 Claims, 9 Drawing Figures

U.S. Patent   Sep. 15, 1981   Sheet 1 of 2   4,289,318
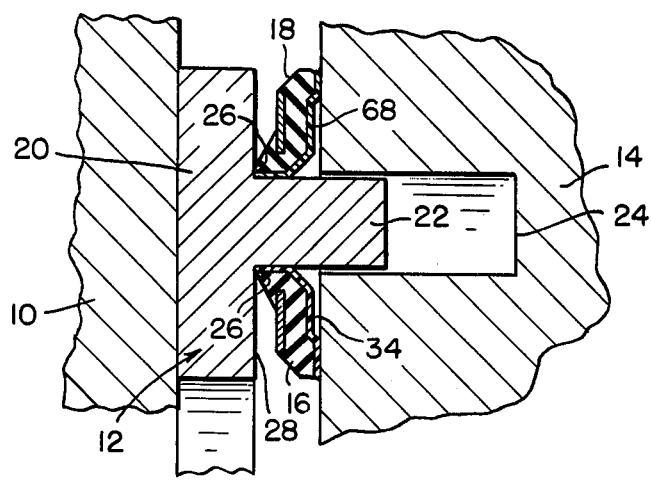
FIG. 1
FIG. 3
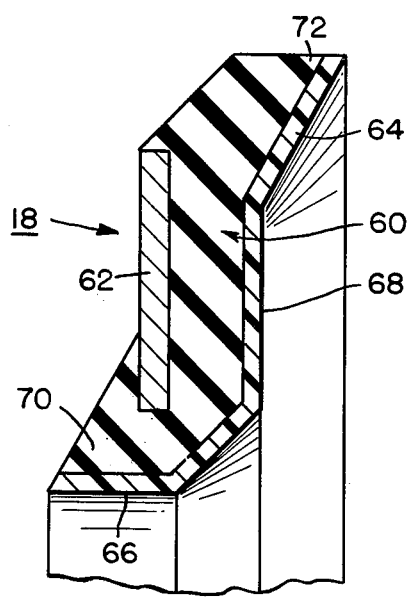
FIG. 2
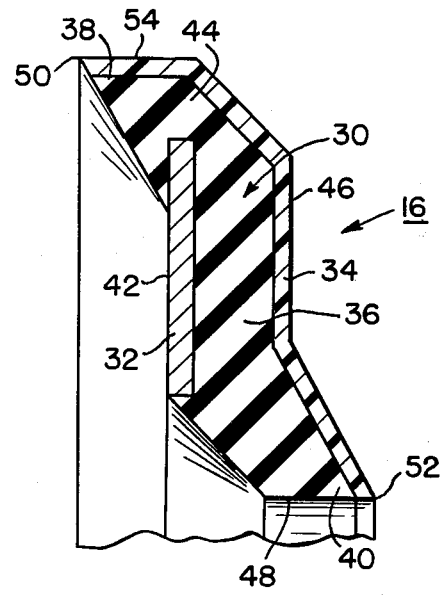

FIG. 5
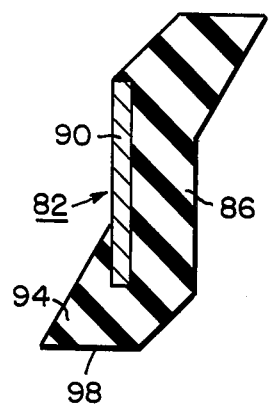
FIG. 7
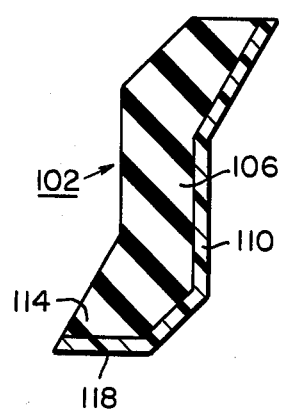
FIG. 9
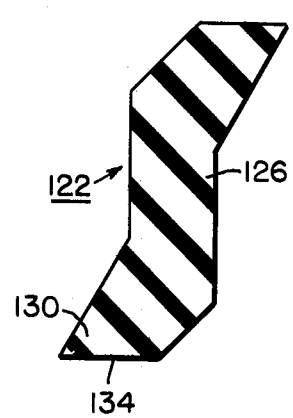
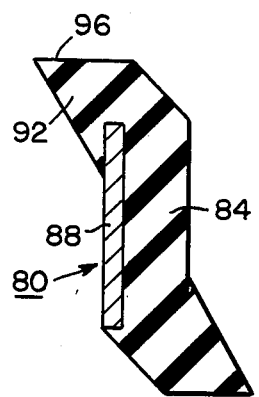
FIG. 4
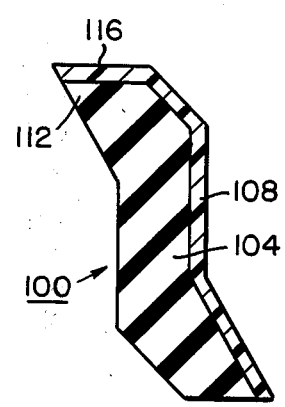
FIG. 6
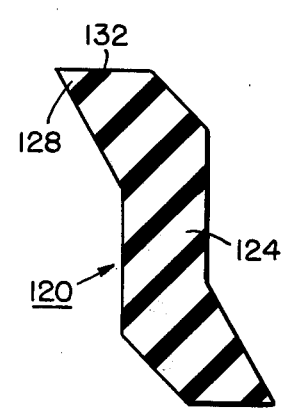
FIG. 8

HYDRAULIC MOTOR BALANCING RING SEAL

TECHNICAL FIELD

This invention relates to seals and in particular to sealing rings for the balancing ring of hydralic motors.

BACKGROUND

The prior art sealing rings for the balancing rings of hydraulic motors are bellville washers, as shown in U.S. Pat. No. 3,572,983, constructed from resilient material such as polytetrafluoroethylene. The sealing rings must exclude fluid under pressure of up to 4500 psi from the tongue and groove area of the balancing ring and associated end cap. The axial gap between the balancing ring and the end cap is about 0.081" to 0.095" in the closed assembly in certain motors. The load exerted by the sealing rings on the surface of the balancing ring must be restricted to the inside corners at the tongue, leaving the radial surfaces exposed.

A problem with such prior art polytetrafluoroethylene bellville washers is that they leak because they take a set and lose their preload. A metal bellville washer with sealing material fixed to it would exert an excessive load.

It is an object of the present invention to provide an improved sealing ring for the balancing ring of a hydraulic motor that will provide the desired load without being excessive, that will not take a set and leak, and that will exert load only at such corners of the balancing ring. It is another object of the invention to improve the performance of hydraulic motors by preventing leakage of fluid into the tongue and groove area of the balancing ring and associated end cap, and by preventing the leakage of fluid from the inlet conduit to the outlet conduit.

BRIEF SUMMARY OF THE INVENTION

The present invention provides an improved pair of sealing rings for use in the gap between the balancing ring and end cap in hydraulic motors. The balancing ring includes an annular tongue that extends into an annular groove in the end cap. Inner and outer sealing rings are located in sealing contact with the I.D. and O.D. surfaces, respectively, of the tongue and seal the gap between the balancing ring and the end cap to prevent fluid under pressure from flowing into the tongue and groove area.

The sealing ring of the present invention comprises an annular elastomeric body including a flat, radially extending central ring and a pair of sealing elements projecting axially away from opposite ends of the the central ring. The axially inwardly extending sealing elements have sealing lips in sealing contact with the balancing ring at substantially only the corner thereof (where the tongue meets the radial portion of the balancing ring). The inner and outer sealing rings of the present invention have cylindrical O.D. and I.D. surfaces, respectively, for sealing contact with the inner and outer surfaces, respectively, of the tongue of the balancing ring. Each sealing ring preferably has a reinforcing ring and a liner of low friction material.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 1 is partial cross-sectional view through part of a hydraulic motor showing a valve, a valve seating balancing ring, an end cap, and inner and outer sealing rings according to the present invention;

FIG. 2 is an enlarged partial cross-sectional view of the inner sealing ring of FIG. 1;

FIG. 3 is an enlarged partial cross-sectional view of the outer sealing ring of FIG. 1;

FIGS. 4 and 5 are enlarged partial cross-sectional views of inner and outer sealing rings, respectively, according to another embodiment of the present invention;

FIGS. 6 and 7 are enlarged partial cross-sectional views of inner and outer sealing rings, respectively, according to a further embodiment of the present invention; and FIGS. 8 and 9 are enlarged partial cross-sectional views of inner and outer sealing rings, respectively, according to a still further embodiment of the present invention.

DETAILED DESCRIPTION OF THE INVENTION

With reference now to the drawings, four different embodiments are shown for each of the inner and outer sealing rings, and in addition FIG. 1 shows the sealing rings installed in a hydraulic motor.

FIG. 1 shows the pertinent portions of a hydraulic motor including a valve (or disc valve) 10, a valve seating balancing ring 12, an end cap 14, an inner valve seating balancing ring sealing ring 16 and an outer valve seating balancing ring sealing ring 18. The balancing ring 12 is mounted in the end cap 14 by means of an annular tongue and groove joint. The balancing ring 12 includes a radial ring 20 and an annular, axially outwardly extending tongue 22 positioned partway in a groove 24 in the end cap 14 for axial sliding movement therein. As will be understood by those skilled in the art, FIG. 1 is a partial cross-sectional view showing only the upper cross-section of the annular balancing ring 12, whereby the sealing ring 18 is the larger diameter outer sealing ring and the sealing ring 16 is the smaller diameter inner sealing ring. The nature and operation of such hydraulic motors are well-known to those skilled in the art and therefore, need not and will not be described in detail here. Such motors are shown in U.S. Pat. No. 3,572,983, for example, wherein FIGS. 8 and 9 thereof are similar sectional views to FIG. 1 herein (except that FIG. 1 is the upper section and such FIGS. 8 and 9 are the lower section). It is also noted that the balancing ring 12 is shown diagrammatically in FIG. 1, without any grooves, springs, etc., because such form no part of the present invention.

The sealings rings 16 and 18 must be capable of sealing fluid under pressure of up to about 4500 psi and excluding it from entering into the tongue and groove area, which can be under a lubricating pressure of about 100 psi. The sealing rings 16 and 18 must seal regardless of the axial position and movement of the balancing ring 12, and any load exerted on the balancing ring must be restricted to the corners 26, thereof, leaving the radially outer surface 28 of the balancing ring exposed. The term "axially inner" direction for the sealing rings is hereby defined to mean the direction toward the balancing ring 12 (i.e. to the left in FIG. 1 and in all Figs.); the opposite direction is the "axially outer" direction.

FIGS. 2 and 3 are enlarged partial cross-sectional views of the preferred sealing rings 16 and 18, respectively, shown in their as-molded condition in contrast to their as-installed condition shown in FIG. 1.

FIG. 2 shows the inner sealing ring 16 which includes a unitary molded elastomeric body 30, a reinforcing ring 32 preferably of metal, and a liner 34 preferably of polytetrafluoroethylene and bonded to the elastomeric body 30. The elastomeric body 30 includes a flat central ring 36 and first and second sealings elements 38 and 40, respectively, projecting axially away from opposite ends of said central ring and in opposite axial directions therefrom. The first sealing element 38 extends axially inwardly beyond a first radial surface 42 of the central ring 36 from the radially outer end 44 of the central ring, and the second sealing element 40 extends axially outwardly beyond a second radial surface 46 of the central ring 36 from the radially inner end 48 of the central ring. Each of the sealing elements 38 and 40 tapers to a sealing lip 50 and 52, respectively, in the axial direction away from the central ring 36.

The sealing element 38 and the adjacent end 44 of the central ring 36 have a coextensive cylindrical O.D. surface 54 which is slightly larger than the I.D. of the tongue 22 to provide some interference therebetween.

The axial width of the central ring 36 is less than the minimum gap distance between the balancing ring 12 and the end cap 14, and the axial overall as-molded length of the sealing ring 16 is greater than the maximum gap distance, to provide sealing contact of the sealing lips 50 and 52 on the surface 28 and on the end cap, respectively. When the sealing ring 16 is installed, it seals at the sealing lips 50 and 52 preventing fluid under pressure from entering the tongue and groove section. The elastomer maintains the load on these two points. The reinforcing ring 32 supports the elastomer but does not contribute to the load. The sealing element 38 restricts loading to the corner 26 of the balancing ring 12 as required. If there is relative rotary motion, the liner 34 is useful in reducing wear. If there is not relative rotary motion, there usually is some slight relative axial movement due to vibration and the portion of the liner on the coextensive cylindrical surface 54 reduces wear due to such movement.

The sealing elements 38 and 40 are preferably identical in size, and are preferably triangular in cross-section. The loading of the sealing lip 40 holds most or all of the axially outer radial surface 46 of the central ring 36 away from and out of contact with the end cap 14, as shown in FIG. 1.

FIG. 3 shows the outer sealing ring 18, which in cross-section is a mirror image of the inner sealing ring 16, and therefore need not be described in as great detail as was the sealing ring 16. The sealing ring 18 includes an elastomeric body 60, a reinforcing ring 62, and a polytetrafluoroethylene liner 64 on a cylindrical I.D. surface 66 and on the axially outer radial surface 68. The elastomeric body 60 includes first and second sealing elements 70 and 72.

FIGS. 4 and 5 show inner and outer sealing rings 80 and 82, respectively, according to another embodiment of this invention. These sealing rings 80 and 82 are similar to the sealing rings 16 and 18 in FIGS. 1–3. The sealing rings 80 and 82 include elastomeric bodies 84 and 86 and reinforcing rings 88 and 90 respectively, but do not include liners of low friction material. The elastomeric bodies 84 and 86 also include first sealing elements 92 and 94 extending axially inwardly and coextensive cylindrical O.D. and I.D. surfaces 96 and 98, respectively. These sealing rings 80 and 82 would be used in place of the sealing rings 16 and 18 of FIGS. 1–3, in applications where it is found that the liners are not essential, because the sealing rings 80 and 82 would be less expensive to manufacture than rings 16 and 18.

FIGS. 6 and 7 show inner and outer sealing rings 100 and 102, respectively, according to another embodiment of this invention. These sealing rings 100 and 102 are similar to the sealing rings 16 and 18 in FIGS. 1–3. The sealing rings 100 and 102 include elastomeric bodies 104 and 106 and liners 108 and 110 of low friction material, respectively, but do not include reinforcing rings. The elastomeric bodies 100 and 102 also include first sealing elements 112 and 114 extending axially inwardly and coextensive cylindrical O.D. and I.D. surfaces 116 and 118, respectively. These sealing rings 100 and 102 would be used in place of the sealing rings 16 and 18, in applications where it is found that the liner is helpful but where the reinforcing rings are not essential (for example, where harder rubber is used for a higher loading of the sealing elements), because the sealing rings 100 and 102 would be less expensive to manufacture than rings 16 and 18.

FIGS. 8 and 9 show inner and outer sealing rings 120 and 122, respectively, according to another embodiment of this invention. These sealings rings 120 and 122 are similar to the sealing rings 16 and 18 in FIGS. 1–3; they include elastomeric bodies 124 and 126, respectively, but they do not include liners of low friction material or reinforcing rings. The elastomeric bodies 124 and 126 also include first sealing elements 128 and 130 extending axially inwardly and coextensive cylindrical O.D. and I.D. surfaces 132 and 134, respectively. These sealing rings 120 and 122 would be used in place of the sealing rings 16 and 18, in applications where it is found that neither the liners nor the reinforcing rings are essential.

The invention has been described in detail with particular reference to the preferred embodiments thereof, but it will be understood that variations and modifications can be affected within the spirit and scope of the invention as described hereinafter and as defined in the appended claims. For example, the sealing rings of this invention can be used in various hydraulic motors, regardless of what type of relative motion exists between the balancing ring and the end cap, and as well as in other applications. The liner of low friction material can be limited to the cylindrical O.D. surface of the inner sealing ring and to the cylindrical I.D. surface of the outer sealing ring if desired, or it can be limited to such cylindrical surface plus the tapered surface of the second (axially outwardly extending) sealing element. The shape of the sealing rings can be varied from that shown in the drawings, the location and nature of the reinforcing ring can be changed, if desired, and the O.D. surface of the outer ring and the I.D. surface of the inner ring need not be cylindrical. Further, while only single sealing lips are shown in each axial direction, additional lips can be used, if desired. The shape and relative size of the sealing elements can be varied from that shown.

We claim:

1. An annular elastomeric sealing ring comprising a unitary elastomeric body including a flat, radially extending central ring, a pair of sealing elements projecting axially away from opposite ends of said central ring and in opposite axial directions therefrom, said sealing elements each tapering to a sealing lip in the direction axially away from said central ring, and at least one of said sealing elements and the adjacent radial end of said central ring having a coextensive cylindrical surface forming one of the I.D. or the O.D. surfaces of of said sealing ring.

2. The sealing ring as recited in claim 1 wherein said central ring includes a reinforcing ring.

3. The sealing ring as recited in claim 2 wherein said reinforcing ring is a metal ring bonded to said elastomeric body and having radial ends terminating inside of said central ring and spaced apart from the I.D. and O.D. surfaces of said sealing ring.

4. The sealing ring as recited in claim 2 wherein said sealing elements include a first sealing element extending axially inwardly and a second sealing element extending axially outwardly, wherein said at least one sealing element is said first sealing element, whereby said first sealing element has a coextensive cylindrical surface with the adjacent end of said central ring, and including a liner of low friction material on said coextensive cylindrical surface.

5. The sealing ring as recited in claim 4 wherein said central ring includes a first, axially inner radial surface and a second, axially outer radial surface, and wherein said liner of low friction material also covers said second radial surface.

6. The sealing ring as recited in claim 5 wherein said liner also covers the axially outwardly facing surface of said second sealing element.

7. The sealing ring as recited in claim 6 wherein said sealing elements are substantially identical in size.

8. The sealing ring as recited in claim 7 wherein each of said sealing elements and the adjacent end of said central ring have coextensive cylindrical surfaces, one forming the I.D. surface and one forming the O.D. surface of said sealing ring.

9. The sealing ring as recited in claim 1 wherein said sealing elements include a first sealing element extending axially inwardly and a second sealing element extending axially outwardly, wherein said at least one sealing element is said first sealing element, whereby said first sealing element has a coextensive cylindrical surface with the adjacent end of said central ring, and including a liner of low friction material on said coextensive cylindrical surface.

10. The sealing ring as recited in claim 9 wherein said central ring includes a first, axially inner radial surface and a second, axially outer radial surface, and wherein said liner of low friction material also covers said second radial surface.

11. The sealing ring as recited in claim 10 wherein said liner also covers the axially outwardly facing surface of said second sealing element.

12. The sealing ring as recited in claim 11 wherein said central ring includes a reinforcing ring having radial ends terminating inside of said central ring and spaced apart from the I.D. and O.D. surfaces of said sealing ring.

13. An annular, elastomeric sealing ring for a valve seating balancing ring for a hydraulic motor comprising:

(a) a unitary molded elastomeric body;
(b) said body including a flat central ring having first and second radial surfaces and first and second axial end surfaces, said first radial surface being the axially inner radial surface and said second radial surface being the axially outer radial surface of said central ring, and said first axial surface being the radially inner end surface and said second axial surface being the radially outer end surface of said ring;
(c) said body also including an annular first sealing element extending axially inwardly from one radial end portion of said central ring and tapering to a sealing lip; and
(d) said body also including an annular second sealing element extending axially outwardly from the other radial end portion of said central ring and tapering to a sealing lip.

14. The sealing ring as recited in claim 13 wherein said sealing ring is an inner sealing ring for said valve seating balancing ring wherein: said one radial end portion is the radially outer end portion of said central ring, and said other radial end portion is the radially inner end portion of said central ring, and wherein said first sealing element and the adjacent radially outer end portion of said central ring have a coextensive cylindrical O.D. surface, forming the O.D. surface of said sealing ring.

15. The sealing ring as recited in claim 14 wherein said central ring includes a reinforcing ring.

16. The sealing ring as recited in claim 15 wherein said reinforcing ring is metal and has radial ends terminating inside of and spaced away from the end surfaces of said central ring.

17. The sealing ring as recited in claim 16 including a liner of low friction material on said cylindrical O.D. surface of said inner sealing ring.

18. The sealing ring as recited in claim 17 wherein said liner also covers said second radial surface of said central ring.

19. The sealing ring as recited in claim 18 wherein said liner also covers the axially outwardly facing surface of said second sealing element.

20. The sealing ring as recited in claim 19 wherein said liner is polytetrafluoroethylene.

21. The sealing ring as recited in claim 20 wherein said sealing elements are substantially identical in size.

22. The sealing ring as recited in claim 21 wherein each of said sealing elements and the adjacent end of said central ring have coextensive cylindrical surfaces, one forming the I.D. surface and one forming the O.D. surface of said sealing ring.

23. The sealing ring as recited in claim 14 including a liner of low friction material on said cylindrical O.D. surface of said inner sealing ring.

24. The sealing ring as recited in claim 23 wherein said liner also covers said second radial surface of said central ring.

25. The sealing ring as recited in claim 24 wherein said liner also covers the axially outwardly facing surface of said second sealing element.

26. The sealing ring as recited in claim 13 wherein said sealing ring is an outer sealing ring for said valve seating balancing ring wherein: said one radial end portion is the radially inner end portion of said central ring, said other radial end portion is the radially inner end portion of said central ring, and wherein said first sealing element and the adjacent radially inner end portion of said central ring have a coextensive cylindrical I.D. surface, forming the I.D. surface of said sealing ring.

27. The sealing ring as recited in claim 26 wherein said central ring includes a reinforcing ring.

28. The sealing ring as recited in claim 27 wherein said reinforcing ring is metal and has radial ends terminating inside of and spaced away from the end surfaces of said central ring.

29. The sealing ring as recited in claim 28 including a liner of low friction material on said cylindrical I.D. surface of said outer sealing ring.

30. The sealing ring as recited in claim 29 wherein said liner also covers said second radial surface of said central ring.

31. The sealing ring as recited in claim 30 wherein said liner also covers the axially outwardly facing surface of said second sealing element.

32. The sealing ring as recited in claim 31 wherein said liner is polytetrafluoroethylene.

33. The sealing ring as recited in claim 32 wherein said sealing elements are substantially identical in size.

34. The sealing ring as recited in claim 33 wherein each of said sealing elements and the adjacent end of said central ring have coextensive cylindrical surfaces, one forming the I.D. surface and one forming the O.D. surface of said sealing ring.

35. The sealing ring as recited in claim 26 including a liner of low friction material on said cylindrical I.D. surface of said outer sealing ring.

36. The sealing ring as recited in claim 35 wherein said liner also covers said second radial surface of said central ring.

37. The sealing ring as recited in claim 36 wherein said liner also covers the axially outwardly facing surface of said second sealing element.

38. An apparatus comprising:
(a) an annular valve seating balancing ring for a hydraulic motor, said balancing ring being "T-shaped" in cross-section and including a radially extending ring and an axially extending annular tongue;
(b) an end cap for a hydraulic motor positioned adjacent said balancing ring and having an annular axially extending groove therein; said balancing ring tongue extending into said groove;
(c) a pair of valve seating balancing ring sealing rings located in the annular space between and in sealing contact with each of said balancing ring and said end cap, said sealing rings including an inner sealing ring in sealing contact with the I.D. of said tongue and an outer sealing ring in sealing contact with the O.D. of said tongue; and
(d) each of said sealing rings comprising a single unitary elastomeric body including a flat central ring, a pair of sealing elements projecting axially away from opposite ends of said central ring and in opposite axial directions therefrom, said sealing elements each tapering to a sealing lip in the direction axially away from said central ring, one of said sealing elements and the adjacent radial end of said central ring having a coextensive cylindrical surface in contact with said tongue.

39. The apparatus as recited in claim 38 wherein said central ring of each of said sealing rings includes a reinforcing ring therein.

40. The apparatus as recited in claim 39 wherein said reinforcing ring is a metal ring bonded to said elastomeric body and having radial end portions terminating inside of said central ring and spaced apart from the surface of said sealing ring in sealing contact with said tongue.

41. The apparatus as recited in claim 40 wherein each of said sealing rings includes a liner of low friction material on said coextensive cylindrical surface in contact with said tongue.

42. The apparatus as recited in claim 41 wherein said liner also covers the radial surface of each of said sealing rings facing said end cap.

43. The apparatus as recited in claim 38 wherein each of said sealing rings includes a liner of low friction material on said coextensive cylindrical surface in contact with said tongue.

44. The apparatus as recited in claim 43 wherein said liner also covers the radial surface of each of said sealing rings facing said end cap.

45. The apparatus as recited in claim 38 wherein the O.D. of said inner ring is slightly greater than the I.D. of said tongue to provide interference and the I.D. of said outer ring is smaller than the O.D. of said tongue to provide interference.

46. The apparatus as recited in claim 38 wherein the axial length of said inner and outer sealing rings as molded is greater than the maximum axial operating distance of the annular gap between said balancing ring and said end cap.

47. The apparatus as recited in claim 38 wherein said sealing rings contact said balancing ring substantially only at the corner between said tongue and said radial ring.

48. The apparatus as recited in claim 38 wherein the axial thickness of said central ring is less than the minimum axial operating distance of the annular gap between said balancing ring and said end cap.

* * * * *

UNITED STATES PATENT AND TRADEMARK OFFICE
CERTIFICATE OF CORRECTION

PATENT NO. : 4,289,318
DATED : September 15, 1981
INVENTOR(S) : Douglas A. Cather and Martin E. Benjamin It is certified that error appears in the above—identified patent and that said Letters Patent is hereby corrected as shown below:

In Claim 1, second from last line, delete "of", second occurrence.

Signed and Sealed this

Twelfth Day of January 1982

[SEAL]

Attest:

Attesting Officer

GERALD J. MOSSINGHOFF

Commissioner of Patents and Trademarks